United States Patent Office 3,484,522
Patented Dec. 16, 1969

3,484,522
ALPHA-(1-CYANOHYDROCARBYLOXY) - 2-HALO-VINYL PHOSPHATE ESTER NEMATOCIDE
William E. Weesner, Dayton, Ohio, assignor to Monsanto Company, St. Louis, Mo., a corporation of Delaware
No Drawing. Original application June 11, 1963, Ser. No. 286,938, now Patent No. 3,324,203, dated June 6, 1967. Divided and this application Dec. 7, 1966, Ser. No. 618,557
Int. Cl. A01n 7/04, 9/36; C07f 9/00
U.S. Cl. 424—210
5 Claims

ABSTRACT OF THE DISCLOSURE

The use of alpha - (1 - cyanohydrocarbyloxy)-2-halovinyl phosphate esters in the control of nematodes. The new nematocidical compounds are applied in a conventional manner.

CROSS-REFERENCES TO RELATED APPLICATIONS

This application is a divisional application of application Ser. No. 286,938 filed June 11, 1963, now U.S. Patent 3,324,203.

SUMMARY OF THE INVENTION

This invention relates to organic phosphorus compounds. More particulaly this invention provides a group of new phosphate esters containing various reactive moieties including vinyl unsaturation, halogen, and cyano groups.

An object is to provide a new class of phosphate esters having practical utility as nematocides and having chemically active moieties making the compounds useful as intermediates in the preparation of other phosphorus containing compounds.

It is a further object of this invention to provide active nematocide compositions containing as an active ingredient therein at least one of the new phosphate esters hereinafter described and a surface active agent as a dispersant therefor.

Other objects, aspects, and advantages of this invention will become apparent from a reading of the description and claims hereinbelow.

One aspect of this invention provides as new compounds, phosphate esters which may be described by the following general formula

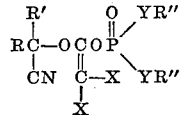

wherein R is selected from the group consisting of hydrogen alkyl, aryl, alkaryl, aralkyl, cycloalkyl, furyl, and thienyl; R' denotes hydrogen, lower alkyl of from 1 to 6 carbons except that R and R″ taken together with the carbon to which they are attached complete a cycloalkane ring having from 5 to 6 carbon atoms and a total of from 5 to 10 carbon atoms; each X is selected from the group consisting of hydrogen, chlorine, and bromine, provided that not more than one X is hydrogen, i.e., at least one X is chlorine or bromine; each Y is selected from the group consisting of oxygen and sulfur; and each R″ is a lower alkyl.

Another aspect of this invention provides a method or process for preparing compounds of the above described type by reacting a tri-lower alkyl phosphite with a 1-cyanohydrocarbylacetate having from 2 to 3 chlorine or bromine atoms bonded to the 2-carbon atom of the acetate moiety in substantially equimolar proportions. The term "1-cyanohydrocarbyl" is used as a general term to refer to the RCH(CN) moiety of the above described compounds.

Another aspect of the invention provides nematocidal compositions containing as an active ingredient therein at least one compound of the above described type and a surface active agent as a dispersant therefor.

DESCRIPTION OF THE PREFERRED EMBODIMENTS

The compounds described above may be generally referred to as 1- or alpha - (1 - cyanohydrocarbyloxy)-2-chloro- and 2-bromovinyl phosphate esters. Illustrative examples of this class are dimethyl 1 - (1-cyanododecyl-oxy)-2,2-dibromovinyl phosphate and di-isopropyl 1-(1-cyano-2-phenyl-ethyloxy)-2-chlorovinyl phosphate. In describing the compounds of this invention the term "hydrocarbyl" and "hydrocarbyloxy" are used herein for convenience to refer generically to any of the above described alkyl, aryl, alkaryl, aralkyl, cycloalkyl, furyl, and thienyl groups. In the above compounds, it is preferred that R denote hydrogen, alkyl groups, either straight or branched of from 1 to 15 carbons, cycloalkyl containing from 5 to 6 carbons in the cycloalkyl ring and up to 10 carbon atoms, aryl having from 6 to 10 carbon atoms, alkaryl and aralkyl groups having from 7 to 10 carbon atoms, as well as the heterocyclic furyl and thienyl groups; R' is hydrogen, lower alkyl, preferably methyl or ethyl, or is part of a cycloalkyl ring. The lower alkyl denoted by R″ may contain up to, say, 6 carbon atoms but preferably contain 1, 2, or 3 carbon atoms.

A particularly preferred sub-class of compounds within the above class of phosphates are the dialky 1-(1-cyanoalkyloxy)-2,2-dichlorovinyl phosphates and the dialkyl 1 - (1 - cyanocyclohexyloxy) - 2,2-dichlorovinyl phosphates. These compounds are prepared by reacting the trialkyl phosphite with the respective 1 - cyanoalkyl 2,2,2-trichloroacetate or 1-cyanocycloalkyl 2,2,2-trichloroacetate in substantially equimolar proportions.

The cyanohydrocarbyl 2-haloacetates which are used as starting materials in preparing the phosphates of this invention are, in turn, prepared by reacting an R-cyanohydrin with a 2,2-dichloro or 2,2,2-trichloro or 2,2-dibromo or 2,2,2-tribromoacetyl chloride or bromide, i.e., the acetyl chloride or bromide has at least 2 and up to 3 chlorine or bromine atoms bonded to the 2- or alpha carbon atom, any carbon valence not being so satisfied are satisfied by hydrogen. For example, a starting material for use in this invention may be prepared by reacting the α-hydroxy nitrile of benzaldehyde (from benzaldehyde and hydrogen cyanide) (mandelonitrile) with 2,2,2-tribromoacetyl bromide to obtain α-cyanobenzyl 2,2,2-tribromoacetate. Another starting material can be prepared by reacting hydroxyethanenitrile (glycolonitrile) with 2,2-dichloroacetyl chloride to obtain cyanomethyl 2,2-dichloroacetate. Useful cyanohydrins can also be prepared from ketones such as acetone, 3-pentanone, methyl ethyl ketone, cyclohexanone, etc., and hydrogen cyanide. For example, 1-cyano-1-methylpropyl 2,2,2-tribromoacetate, a starting material in the process of this invention can be prepared by reacting 2-hydroxy-2-butanenitrile from methyl ethyl ketone and HCN with 2,2,2-tribromoacetyl bromide. Other 1-cyano-substituted 2-haloacetate esters which can be used include the cyanoalkyl chloro- and bromoacetates, e.g., 1-cyanoethyl, 1-cyanopropyl, 1-cyanoisopropyl, 1-cyanobutyl, 1-cyanoisobutyl, 1-cyanopentyl, 1-cyanohexyl, 1-cyanoheptyl, 1-cyano-2-ethylhexyl, 1-cyano-2,6,6-trimethylheptyl, 1-cyanooctyl, 1-cyanononyl, 1-cyanodecyl, 1-cyanoisodecyl, 1-cyanoundecyl, 1-cyanododecyl, 1-cyanopentodecyl, 1-cyanocyclopentyl, 1-cyanocyclohexyl, 1-cyano - 4 - methylcyclohexyl, 1 - cyano-4,6-dimethylcyclohexyl, 1-cyano-3-butylcyclohexyl, di- and tribromo and -chloroacetate, etc., the aryl, alkaryl, and aralkyl such as α-cyanobenzyl, α-cyano-4-methylbenzyl, cyano(naphthylmethyl) α-cyano-0-xlylyl α,α-dichloro- and bromoacetates. It is preferred that the carbon atom in the alpha position relative to the acetate carboxyl group be fully saturated with either chlorine or bromine atom substituents or mixtures of the two. Thus 2,2,2-trichloroacetyl chloride and its bromine containing counterpart 2,2,2-tribromoacetyl bromide are preferred starting materials.

The cyanohydrins derived by condensing heterocyclic aldehydes such as furaldehyde and thiophenecarboxaldehyde with hydrogen cyanide may also be used for reaction with trihaloacetyl chloride. Such compounds as for example cyano(2-furyl)methyl 2,2,2-tribromoacetate, cyano(2-thienyl)methyl 2,2,2-trichloroacetate, etc., are useful in preparing compounds within the scope of the invention.

The phosphite esters useful for preparing the phosphates of this invention are the lower alkyl triesters of the formula R"OP(YR")$_2$ wherein R" is a lower alkyl group having from 1 to 6 carbon atoms and Y is oxygen or sulfur. Examples of trialkyl phosphites are trimethyl, triethyl, tripropyl, triisopropyl, tributyl, triisobutyl, tripentyl, trihexyl, as well as phosphite esters having mixed ester groups such as dimethyl ethyl, diethyl propyl, dipropyl ethyl, and dihexyl propyl phosphites. The preferred esters are the trimethyl, triethyl, triisopropyl phosphite esters.

Other phosphite esters which may be used are the mono-thio and dithio ester analogs e.g., S,S-dimethyl methyl phosphorodithioite, O-butyl, S,S-dibutyl phosphorodithioite, O,O-dihexyl S-hexyl phosphorothioite, S,S-diethyl ethyl phosphorodithioite, S,S-diisopropyl isopropyl phosphorodithioite, S-butyl dibutyl phosphorothioite, S-isohexyl diisohexylphosphorothioite, and the mixed esters such as S-methyl S-ethyl ethyl phosphorodithioite, S-propyl dipentyl phosphorothioite, etc. The phosphorotrithioite esters are not included in the process of this invention since they do not react as do the oxy- thio- and dithio phosphite esters.

In the process of this invention the reaction between the acetate and phosphite reactants, as described above, may be conducted over any temperature range in which the reactants are stable and in which the speed of the reaction is satisfactorily controlled. Generally, this will involve use of temperatures on the order of from about −20° C. to about 100° C., with temperatures on the order of from about 0° C. to 50° C. being preferred. The two reactants may be added simultaneously to the reaction vessel, or one may be added to the other. It is preferred to slowly add the phosphite ester to the acetate reactant either alone, or admixed with a suitable diluent or solvent to control the heat and the speed of the reaction. No diluent is necessary for this reaction if the reactants are combined slowly. Generally, however, for ease of processing it is preferred to mix either one or both reactants with an inert liquid diluent such as benzene, toluene, hexane, heptane, etc. either initially or during the course of the reaction as the need arises to control the heat of reaction and viscosity of the mixture to the desired consistency. The reaction proceeds well at atmospheric pressure so that no sub-atmospheric or super-atmospheric pressure need be used, although such pressures may be used to control the speed of the reaction if desired. Subatmospheric pressures are especially useful when it is desired to remove the evolved chlorinated or brominated alkyl by-product during the course of the reaction without raising of the temperature.

When the reaction is completed as evidenced by cessation of any heat of reaction or cessation of change in the refractive index, any alkyl halide by-product and diluent may be removed by any conventional means known to those skilled in the art. As mentioned above any alkyl halide not removed during the course of the reaction may be volatilized off together with any volatile diluent preferably under reduced pressure. The products of this invention generally are liquids, usually viscous in nature, but some of them may be solid in nature. They may be purified, if desired, by washing or rinsing them to remove adhering by-product or diluent, and then concentrated to obtain the product as residue. If the product is to be used as a nematocide or for other agricultural use, it is not necessary to use vigorous purification steps.

Examples of products produced by the process of this invention and the reactants from which they are obtained are:

Dimethyl 1-(1-cyanomethoxy) - 2,2 - dichlorovinyl phosphate obtained by reacting trimethyl phosphite with 1-cyanomethyl 2,2,2-trichloroacetate;

Dihexyl 1-(1-cyanotridecyloxy) - 2 - bromovinyl phosphate obtained by reacting trihexyl phosphite with 1-cyanotridecyl 2,2-dibromoacetate;

Dipropyl 1-[cyano(α-thenyl)methoxy] - 2,2 - dichlorovinyl phosphate obtained by reacting tripropyl phosphite with cyano(α - thenyl)methyl 2,2,2 - trichloroacetate;

Dihexyl 1-(1-cyanocyclohexyloxy) - 2,2 - dibromovinyl phosphate obtained by reacting trihexyl phosphite with 1-cyanocyclohexyl 2,2,2-tribromoacetate;

S,S-diethyl O-[1-(α-cyano-p-methylbenzyloxy) - 2,2 - dichlorovinyl] phosphorodithioate obtained by reacting S,S-diethyl ethyl phosphorodithioite with α-cyano - p-methylbenzyl 2,2,2-trichloroacetate;

S,S-dihexyl O-[1-(1-cyano-2-phenylethoxy - 2,2- dibromovinyl phosphorodithioate obtained by reacting S,S-dihexyl hexyl phosphorodithioate with 1-cyano-2-phenylethyl 2,2,2-tribromoacetate;

S,S-dimethyl O-{1-[cyano(2-furyl)methoxy] - 2,2 - dichlorovinyl}phosphorodithioate obtained by reacting S,S-dimethyl methyl phosphorodithioite with cyano(2-furyl)methyl 2,2,2-trichloroacetate;

Diethyl 1-(1-cyano-3-methylcyclopentyloxy) - 2 - chlorovinyl phosphate obtained by reacting triethyl phosphite with 1-cyano-3-methyl cyclopentyl 2,2-dichloroacetate;

Bis(isopropyl) 1-(α-cyano-2,4,6-trimethyl benzyloxy)-2,2-dichlorovinyl phosphate obtained from triisopropyl phosphite and α-cyano-2,4,6-trimethylbenzyl 2,2,2 - trichloroacetate;

Diethyl 1-(1-cyano-4-phenylbutoxy) - 2,2 - dibromovinyl phosphate obtained by reacting triethyl phosphite with 1-cyano-4-phenylbutyl 2,2,2-tribromoacetate;

Dipropyl 1-(1-cyano - 3,5 - diethyl cyclohexyloxy) - 2-chlorovinyl phosphate obtained by reacting tripropyl phosphite with 1-cyano-3,5 - diethyl cyclohexyl 2,2-dichloroacetate;

The dialkyl 1-(1-cyanohydrocarbyloxy) - 2 - halovinyl phosphates and phosphorothioates are useful as soil sterilizing agents, insecticides and nematodes. This invention thus provides a method for controlling nematodes which may be practiced by any method which accomplishes dispersion of the dialkyl or 1-(1-cyanohydrocarbyloxy)-2-halovinyl phosphate in the soil. Any of the well known procedures for effecting this result may be utilized; for example, by injecting the compound, or formulations containing the compound into the soil, by depositing the substance or formulations on the surface of the soil and dispersing them within the soil by any conventional mechanical equipment, and by drenching the soil with a solution or liquid dispersion in water.

The choice of the means of dispersing the toxicants in the soil is within the province of one skilled in the art. If the compounds are volatile as are some of the lower molecular weight compounds, the treating agents are preferably dissolved or dispersed within a suitable liquid medium which when formulated with a suitable emulsifying agent or other surface active agent will enable a uniform dispersion in water. The use of solutions or dispersions also insures a uniform application of the compound to the soil being treated.

However the toxicants are formulated, the treatment of the soil must necessarily involve the incorporation of an amount sufficient to destroy the nematodes therein. Some variation will be observed with different soil types, and some differences in rate of application will be dictated by the sensitivity of some plants to the compounds. An additional advantage of the compounds of this invention is the ability of such compounds to act as systemic nematocides that is, the compounds translocate in the plant system and control nematodes feeding thereon.

In nematocidal applications these compounds may be added to the soil in solid formulation, frequently referred to as dusts, which may contain in addition to the active ingredient, diluents, or extenders to absorb the toxicant compound and thereby prevent too rapid dissipation, and dispersing agents to prevent local high concentrations. In addition these components facilitate the distribution of the active ingredients in soil and soil waters.

Suitable solid diluents are those which render the composition dry and permanently free flowing. Thus hygroscopic materials should be avoided. Effective solid diluents are the finely divided carriers, including the clays such as the kaolinites, the bentonites, and the attapulgites; other minerals in the natural state, such as talc, pyrophyllite, quartz, diatomaceous earth, fullers earth, chalk, rock phosphate, and sulfur; and chemically modified minerals such as acid washed bentonites, precipitated calcium phosphates, precipitated calcium carbonate and colloidal silica. These diluents may represent a substantial portion, for example, 50% to 98% by weight, of the entire formulation.

Liquid compositions for nematocidal uses may be solutions or liquid dispersions. The choice of the liquid medium will depend to a great extent upon the physical properties of the active ingredient. It is frequently desirable to add a small amount of an organic solvent which can be readily dispersed in the aqueous medium to produce a heterogeneous dispersion of the active ingredient in water.

From an economical point of view the manufacturer must supply the agriculturist with a low cost concentrate or spray base or particulate solid base in such form that by merely mixing with water or solid extender (e.g. powdered clay or talc) or other low cost material available to the agriculturist at the point of use, he will have an easily prepared insecticidal or mematocidal spray or particulate solid composition. In such as concentrate composition, the compounds of this invention generally will be present in a concentration of from 5 to 90% by weight, the residue being any one or more of the well known biological toxicant adjuvants, such as the various surface active agents (e.g. detergents, a soap or other emulsifying or wetting agents, surface active clays), solvents, diluents, carrier media adhesives, spreading agents, humectants, and the like.

There are a large number of organic liquids which can be used for the preparation of solutions, suspensions, or emulsions of these compounds; for example, there can be used isopropyl ether, acetone, methyl ethyl ketone, dioxane, cyclohexanone, carbon tetrachloride, ethylene dichloride, tetrachloroethane, hexane, heptane, and similar higher liquid alkanes, hydrogenated naphthalenes, solvent naphtha, benzene, toluene, xylene, petroleum fractions (e.g., those boiling almost entirely under 400° F. at atmospheric pressure and having a flash point above about 80° C., particularly kerosene), mineral oils having an unsulfonatable residue above about 80 percent and preferably above about 90%. In those instances wherein there may be concern about the phytotoxicity of the organic liquid extending agent, a portion of the same can be replaced by such low molecular weight aliphatic hydrocarbons as dipentene, diisobutylene, propylene trimer, and the like. In certain instances it is advantageous to employ a mixture of organic liquids as the extending agent.

When supplied to the situs of the biological pest in the form of emulsions or suspensions, the biological toxicant composition containing one or more of the compounds of this invention as the active ingredient may be prepared by dispersing the active component either per se or in the form of an organic solution thereof in water with the aid of a water-soluble surfactant or surface active agent. The term "surfactant" as employed here and in the appended claims is used as in volume II of Schwartz, Perry and Berch's, "Surface Active Agents and Detergents" (1958 Interscience Publishers, Inc., New York), in place of the expression "emulsifying agents" to connote generically the various "emulsifying agents," "dispersing agents," "wetting agents," and "spreading agents" that are adapted to be admixed with the active compounds of this invention in order to secure better wetting and spreading of the active ingredients in the water vehicle or carrier in which they are insoluble by lowering the surface tension of the water (see also Frear, "Chemistry of Insecticides, Fungicides, and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's, "Surface Active Agents and Detergents," cited supra, and also in the November, 1947, issue of Chemical Industries (pages 811–824) in an article entitled, "Synthetic Detergents," by John W. McCutcheon, and also in the July, August, September, and October, 1952, issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water soluble anionic surface active agents set forth in U.S. 2,846,398 (issued Aug. 5, 1958). Mixtures of water soluble anionic and water soluble non-ionic surfactants can be employed.

The dispersions can be provided ready for use in combatting biological pests in general and insects and nematodes in particular in all of the forms described above. However, they can also be provided in a concentrated form suitable for mixing with or dispersing in other extending agents. Illustrative of a particularly useful concentrate is an intimate mixture of a dialkyl 1-(1-cyanocyclohexyloxy)-2,2-dichlorovinyl phosphate of this invention with the water soluble surface active agent which lowers the surface tension of water in the weight proportions of 0.1 to 15 parts of surfactant with sufficient of the dialkyl 1-(1-cyanocyclohexyloxy)-2,2-dichlorovinyl phosphate to make 100 parts by weight. Such a concentrate is particularly adapted to be made into a spray for combatting various forms of insect pests such as flies and mosquitos by the addition of water thereto. As an example of such a concentrate is an intimate mixture of 95 parts by weight of dimethyl 1-(1-cyanoisobutyloxy)-2,2-dichlorovinyl phosphate and 5 parts by weight of a water soluble non-ionic surfactant such as polyoxyethylene ether. Another example of a useful insecticidal concentrate composition is from 2 to 4 lbs. of the dialkyl 1-(1-cyanohydrocarbyloxy)-2,2-halovinyl phosphate dissolved in sufficient organic solvents such as kerosene, xylene, naptha, etc., containing from 1 to 10% of a surface active agent blend to make a gallon of insecticide concentrate composition. The surface active agent blend may comprise, e.g., a mixture of a non-ionic surface active agent such as a polyoxyethylene ether and an anionic surfactive agent such as an alkyl-aryl sulfonate.

A useful nematocidal formulation of these active compounds may involve the solid or liquid concentrate of the dialkyl 1-(1-cyanohydrocarbyloxy)-2-halovinyl phosphate to which has been added formulation aids or conditioning agents so that the concentrates may be mixed with a suitable extender or diluent in the field at the time of use. Obviously, for this purpose the dispersing agent will be present in larger concentrations so that upon dilution with water or a solid extender, compositions containing optimum proportions of the dispersing agent and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

The following examples illustrate methods of preparing dialkl 1-(1-cyanohydrocarbyloxy)-2-halovinyl phosphates and the activity of such compounds as insecticidal and nematocidal agents. These examples are illustrative only and are not meant to limit the scope of the invention.

EXAMPLE 1

2-ethylhexaldehyde cyanohydrin (2-hydroxy-2-ethylheptanenitrile) was first prepared by adding 384 g. of 2-ethylhexaldehyde to 333 grams of potassium pyrosulfite mixed with 750 ml. of water at 16°–37° C. with cooling, adding an additional 100 ml. of water, and adding 148.5 g. of 95% sodium cyanide dissolved in 300 ml. of water with stirring. The crude product was separated from the reaction mixture, washed three times with water, and concentrated to 55° C./0.4 mm. The 2-ethylhexaldehyde cyanohydrin analyzed as containing 69.58% carbon, 11.16% hydrogen, and 9.05% nitrogen as compared with 69.68% carbon, 10.96% hydrogen, and 9.03% nitrogen, the calculated values for $C_9H_{17}NO$. The yield was 95% of theory based on 2-ethylhexaldehyde.

The 2-ethylhexaldehyde cyanohydrin prepared as above was used to prepare 1-cyano-2-ethylhexyl 2,2,2-trichloroacetate as follows:

To 155 g. (1 mole) of the 2-ethylhexaldehyde cyanohydrin prepared as above in 100 ml. of benzene there was added 101 g. (1 mole) of triethylamine over 10 minutes at 15°–22° C. with cooling. Then addition of 182 g. (1 mole) of trichloroacetyl chloride was made over about a one hour period. During the addition, an additional 90 ml. of benzene was added. The temperature during the addition varied from 10°–23° C. Stirring was continued for an additional two hours to insure complete reaction. The reaction mixture was filtered. The precipitate was rinsed with two 300 ml. portions of benzene and then with acetone. The washings were combined with the original filtrate and distilled. The weight of 1-cyano-2-ethylhexyl 2,2,2-trichloroacetate recovered boiling at 110–130° C./0.1–0.8 mm. was 254.5 g., $n_D^{25}$ 1.4601, analyzing as containing 44.82% carbon, 5.70% hydrogen, 4.89% nitrogen, and 34.78% chlorine as compared with 43.92% carbon, 5.02% hydrogen, 4.36% nitrogen, and 35.44% chlorine, the calculated values for $C_{11}H_{16}NO_2Cl_3$.

The 1-cyano-2-ethylhexyl 2,2,2-trichloroacetate, prepared as above, was reacted with trimethyl phosphite as follows:

To 42.0 g. (0.14 mole) of 1-cyano-2-ethylhexyl trichloroacetate, prepared as described above there was added 17.4 g. (0.14 mole) of trimethyl phosphite over a 65-minute period at 18–30° C. with stirring. Stirring was continued for 1.5 hours to insure complete reaction as the temperature was gradually raised to 83° C. A partial vacuum was applied and the temperature of the mixture was gradually raised to 100° C. at 1.0 mm. to distill off the methyl chloride by-product and a small quantity of yellow oil. There remained as residue 48.9 g. of dimethyl 1-(1-cyano-2-ethyl-hexyloxy)-2,2-dichlorovinyl phosphate which analyzed as containing 42.49% carbon, 6.16% hydrogen, 4.0% nitrogen and 19.37% chlorine as compared with the calculated values of 41.71% carbon, 5.88% hydrogen and 3.74% nitrogen and 18.98% chlorine.

EXAMPLE 2

To 183 g. of isodecylaldehyde cyanohydrin there was added 111 g. of triethylamine at 12–22° C. with cooling. Then 200 g. of trichloroacetyl chloride was added over about 100 minutes at 50–20° C. During this addition 200 ml. of benzene was added to dilute the mixture. The mixture was stirred for two hours, filtered, the filter cake was rinsed with benzene and acetone, and the combined filtrate and washings distilled. The resulting 1-cyanoisodecyl 2,2,2-trichloroacetate (B.P. 105–127° C./.20–.25 mm., $n_D^{25}$ 1.4617) was reacted with trimethyl phosphite as follows.

To 39.4 g. (0.12 mole) of 1-cyanoisodecyl 2,2,2-trichloroacetate there was added 14.9 g. (0.12 mole) of trimethyl phosphite over 25 minutes with stirring and cooling at 27°–31° C. Stirring was continued until the exothermic reaction has subsided. The reaction mixture was placed under vacuum at 27°–30° C. to allow methyl chloride by-product to evolve therefrom. It was finally concentrated to 30° C./0.3 mm. leaving as residue 50.3 g. of crude dimethyl 1-(1-cyanoisodecyloxy)-2,2-dichlorovinyl phosphate as product. The product analyzed as follows:

*Analysis.*—Calcd. for $C_{15}H_{26}Cl_2O_5NP$: percent C, 44.77; percent H, 6.49; percent N, 3.48. Found: percent C, 44.41; percent H, 6.67; percent N, 3.49.

EXAMPLE 3

To 48.9 g. (0.2 mole) of 1-cyano-2-methylpropyl 2,2,2-trichloroacetate, prepared by reacting 2-hydroxy-3-methyl butyronitrile with trichloroacetyl chloride, in the manner described in Example 1, there was added 33.2 g. (0.2 mole) of triethyl phosphite over 90 minutes with cooling at 20°–23° C. Stirring was continued for an additional 90 minutes while the temperature was held at about 21°–28° C. Stirring was continued at 25°–30° C. as the pressure was slowly reduced to 50 mm. to remove by-product ethyl chloride. The mixture was finally concentrated to 40° C./0.35 mm. to leave as product 72.3 g. of diethyl 1-(1-cyano-2-methylpropoxy)-2,2-dichlorovinyl phosphate. The product analyzed as follows:

*Analysis.*—Calcd. for $C_{11}H_{18}Cl_2O_5P$: percent C, 38.15; percent H, 5.20. Found: percent C, 38.14; percent H, 5.53.

*Analysis.*—Calcd. for $C_{11}H_{18}Cl_2O_5P$: percent N, 4.04; percent Cl, 20.52. Found: percent N, 3.93; percent Cl, 21.78.

EXAMPLE 4

To 54.1 g. (0.2 mole) of 1-cyanocyclohexyl 2,2,2-trichloroacetate, prepared by reacting 1-hydroxy-1-cyanocyclohexane with 2,2,2-trichloroacetyl chloride, as described in Example 1, there was added 33.2 g. (0.2 mole) of triethyl phosphite at 25°–30° C. over 1 hour with stirring and cooling. Stirring was continued as the pressure was decreased and the temperature was maintained at 30°–42° C. to remove ethyl chloride by-product under pressures down to 20 mm. The product was finally heated to 40°/1.0 mm., leaving as residue 76.9 g. of diethyl 1-(1-cyanocyclohexyloxy)-2,2-dichlorovinyl phosphate.

EXAMPLE 5

To 1 molar proportion of cyano(2-furyl)methyl 2,2-dibromoacetate, prepared by reacting 2-(2-furyl)-2-hydroxyacetonitrile with 2,2-dibromoacetyl chloride with stirring and cooling, there is slowly added 1 molar proportion of trihexyl phosphite, at a temperature of from about 10° C. to 50° C., using benzene as a diluent. When the reaction is completed as evidenced by cessation of heat of reaction, stirring is continued as the pressure is lowered to promote evolution of the hexyl chloride by-product and benzene diluent leaving as residue dihexyl 1-(cyano-2-furylmethoxy)-2-bromovinyl phosphate.

EXAMPLE 6

To one molar proportion of α-cyanobenzyl 2,2,2-trichloroacetate prepared by reacting α-hydroxybenzonitrile with 2,2,2-trichloracetyl chloride as described in Example 1, there is slowly added about one molar proportion of triisopropyl phosphate at a temperature of from about 15° C. to 30° C. with stirring and cooling using hexane as a diluent. When the reaction is completed, the temperature of the resulting reaction mixture is raised to a maximum of about 100° C. while the pressure is reduced to remove the byproduct, isopropyl chloride and diluent, leaving as residue diisopropyl 1-(α-cyanobenzyloxy)-2,2-dichlorovinyl phosphate as product.

EXAMPLE 7

To one molar proportion of 2-cyanoisopropyl 2,2,2-trichloroacetate, prepared by reacting acetone cyanohydrin with 2,2,2-trichloroacetyl chloride, as described in Example 1, there is slowly added about one molar proportion of trimethyl phosphite at a temperature of from about 10°–30° C. with stirring and cooling using hexane as a diluent. After removing the byproduct, methyl chloride, there remains as residue dimethyl 1-(2-cyanoisopropoxy)-2,2-dichlorovinyl phosphate as product.

EXAMPLE 8

This example illustrates that the claimed compounds have nematocidal activity against the organism *Panagrellus redivivus* as follows:

The *Panagrellus redivivus* was cultured in an oatmeal medium prepared by placing 5 grams of dry rolled oats in a 9 cm. petri dish and covering with 10–20 mls. of tap water. The cultures are inoculated by adding 10 mls. of a washed suspension of worms. Variability in vigor and resistance to chemical treatment is largely eliminated by selecting for experiment only worms from cultures 7–14 days old.

Worms for experiment are separated from the culture medium by passage through a Baermann funnel, followed by washing and sedimentation. The washed worms are distributed among Steuder dishes, each dish containing 2 mls. of a suspension of 200–300 worms. To each dish is added a quantity of the test compound so adjusted that the final dilution of test compound in the Steuder dishes is 0.1%.

The worm suspensions are examined under the low power (×12) dissecting microscope at timed intervals of 10 minutes, 20 minutes, 30 minutes, 1 hour, 2 hours, and 24 hours.

In such a test the compounds diethyl 1-(1-cyano-2-methylpropoxy)-2,2-dichlorovinyl phosphate, dimethyl 1-(1-cyanodecyloxy)-2,2-dichlorovinyl phosphate and dimethyl 1-(1-cyano-2-ethylhexyloxy)-2,2-dichlorovinyl phosphate of this invention were active at 0.1% concentration, that is, there was a complete loss of motility of the test organisms in 24 hours. In a comparative control test containing no test compound but otherwise being the same, all the organisms were mobile.

This experiment demonstrates that the test compounds effected a complete kill of the nematodes at this dilute concentration.

EXAMPLE 9

Soil infested with the root-knot nematode *Meloidogyne incognita* var. *acrita* was used to grow tomato plants. The soil was treated with various concentrations of diethyl 1 - (1-cyano-2-methylpropoxy)-2,2-dichlorovinyl phosphate. At the concentration of 0.01% of the test compound per pint of soil, no root-knots were observed in any of the tomato plants grown in the infested soil.

I claim:
1. A method for treating nematode-infested soil which comprises incorporating into the soil nematocidal quantity of a phosphate having the structure

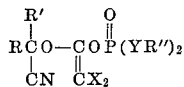

wherein R is selected from the group consisting of hydrogen, alkyl having from 1 to 15 carbon atoms, aryl having from 6 to 10 carbon atoms, alkaryl having from 7 to 10 carbon atoms, and aralkyl having from 7 to 10 carbon atoms, furyl, and thienyl; R' is selected from the group consisting of hydrogen and lower alkyl of from 1 to 6 carbon atoms, except that R and R' taken together with the carbon atom to which they are attached complete a cycloalkane ring having from 5 to 6 carbon atoms and a total of from 5 to 10 carbon atoms; each X is selected from the group consisting of hydrogen, bromine, and chlorine provided that not more than one X is hydrogen; each Y is selected from the group consisting of oxygen and sulfur; and each R'' is lower alkyl having from 1 to 6 carbon atoms.

2. The method defined in claim 1, wherein Y is oxygen.

3. The method defined in claim 1, wherein the phosphate is diethyl 1-(1-cyano-2-methylpropoxy)-2,2-dichlorovinyl phosphate.

4. The method defined in claim 1, wherein the phosphate is dimethyl 1-(1-cyano-2-ethylhexyloxy)-2,2-dichlorovinyl phosphate.

5. The method defined in claim 1, wherein the phosphate is dimethyl 1-(1-cyano-2-ethylhexyloxy)-2,2-dichlorovinyl phosphate.

References Cited

UNITED STATES PATENTS

| | | | |
|---|---|---|---|
| 2,759,961 | 8/1956 | Fitch | 260—461 |
| 2,909,559 | 10/1959 | Lanham | 260—461 |
| 2,992,967 | 7/1961 | Haubein | 167—30 |
| 3,012,933 | 12/1961 | Phillips | 167—30 |
| 3,091,589 | 8/1963 | Brakner | 252—8.5 |
| 3,324,203 | 6/1967 | Weesner | 424—21 X |

ALBERT T. MEYERS, Primary Examiner

LEONARD SCHENKMAN, Assistant Examiner

UNITED STATES PATENT OFFICE
CERTIFICATE OF CORRECTION

Patent No. 3,484,522   Dated December 16, 1969

Inventor(s)   William E. Weesner

It is certified that error appears in the above-identified patent and that said Letters Patent are hereby corrected as shown below:

Column 2, line 33, the word "dialky" should be -- dialkyl --.

Column 4, line 30, the word "phenylethoxy" should be followed by a -- ) --.

Column 4, line 32, the word "phosphorodithioate" should be -- phosphorodithioite --.

Column 5, line 45, the word "mematocidal" should be -- nematocidal --.

Column 8, line 75, the word "phosphate" should be -- phosphite --.

Column 9, line 40, the word "worn" should be -- worm --.

Column 10, line 39, the formula "(1-cyano-2-ethylhexyloxy)" should be -- (1-cyanodecyloxy) --.

SIGNED AND
SEALED
JUN 16 1970

(SEAL)
Attest:

Edward M. Fletcher, Jr.
Attesting Officer

WILLIAM E. SCHUYLER,
Commissioner of Patent